Oct. 15, 1968
C. E. THOMAS
3,406,252
FIBER OPTIC OUTPUT TRANSFORMATION FOR MULTIPLE
ELECTRON DISCHARGE DEVICES
Filed Feb. 11, 1965
4 Sheets-Sheet 1
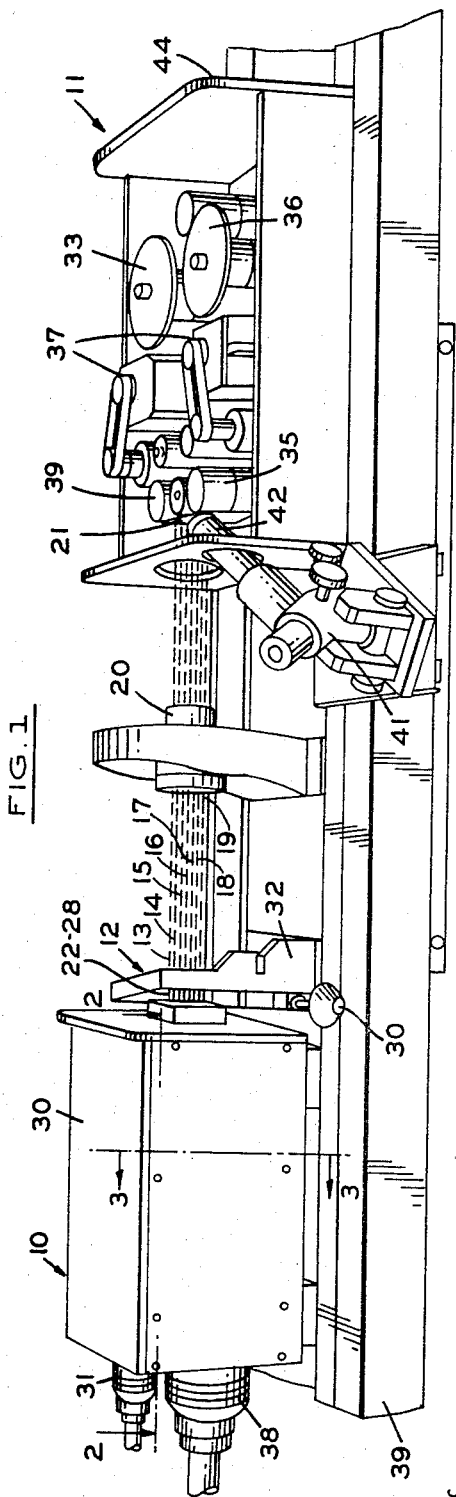
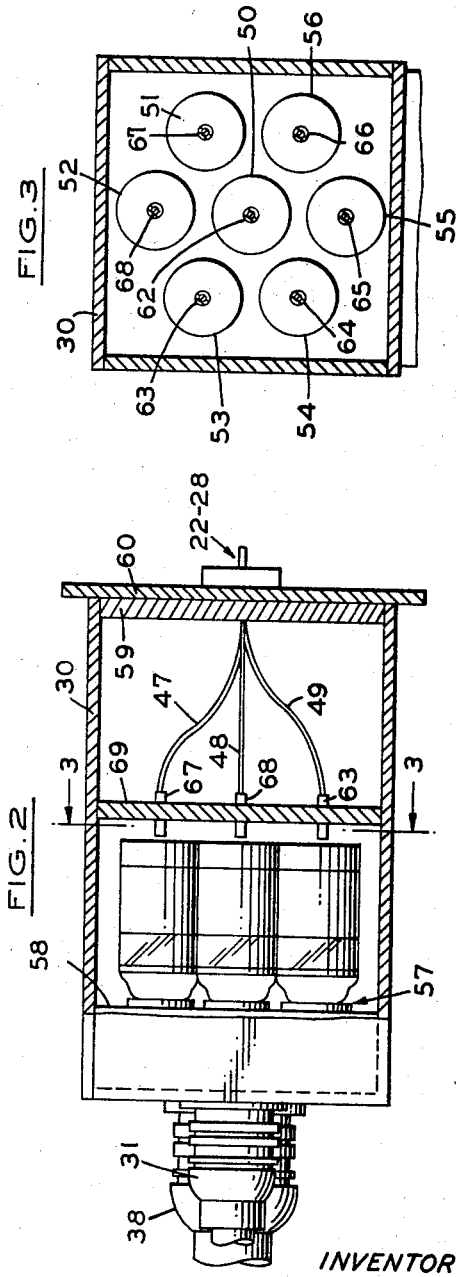
INVENTOR
CARLTON E. THOMAS
BY
Barnes, Kisselle, Ruisch & Choate
ATTORNEYS

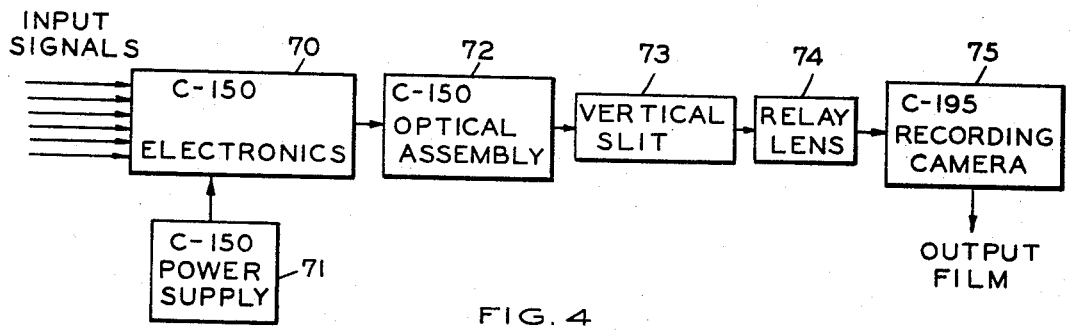
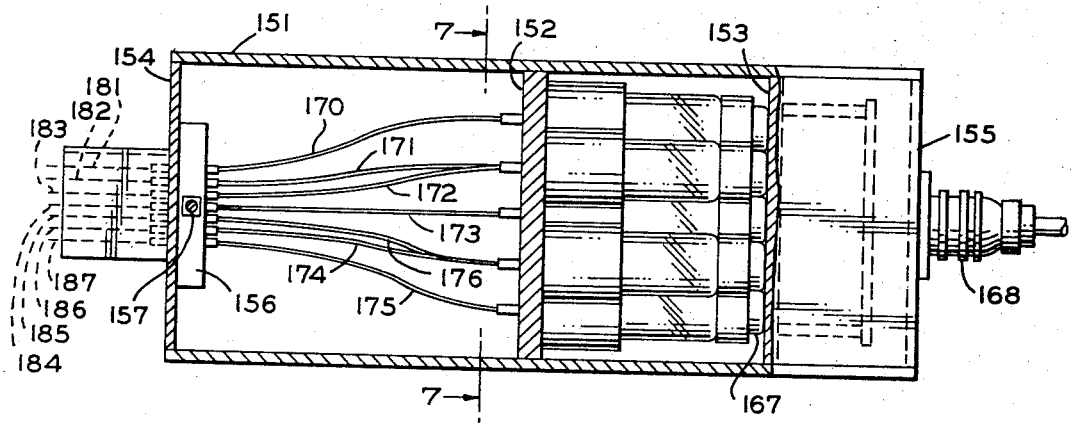

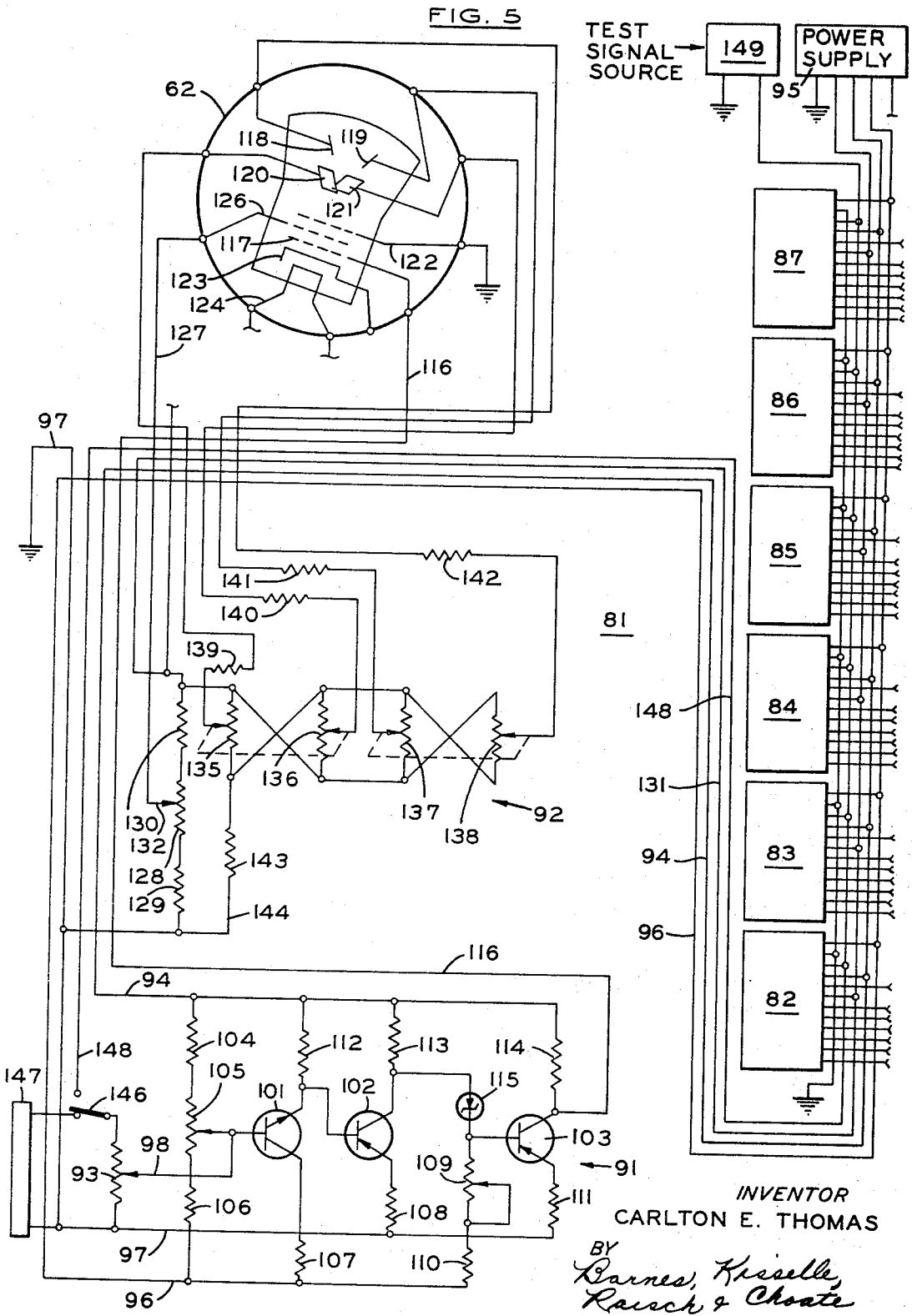

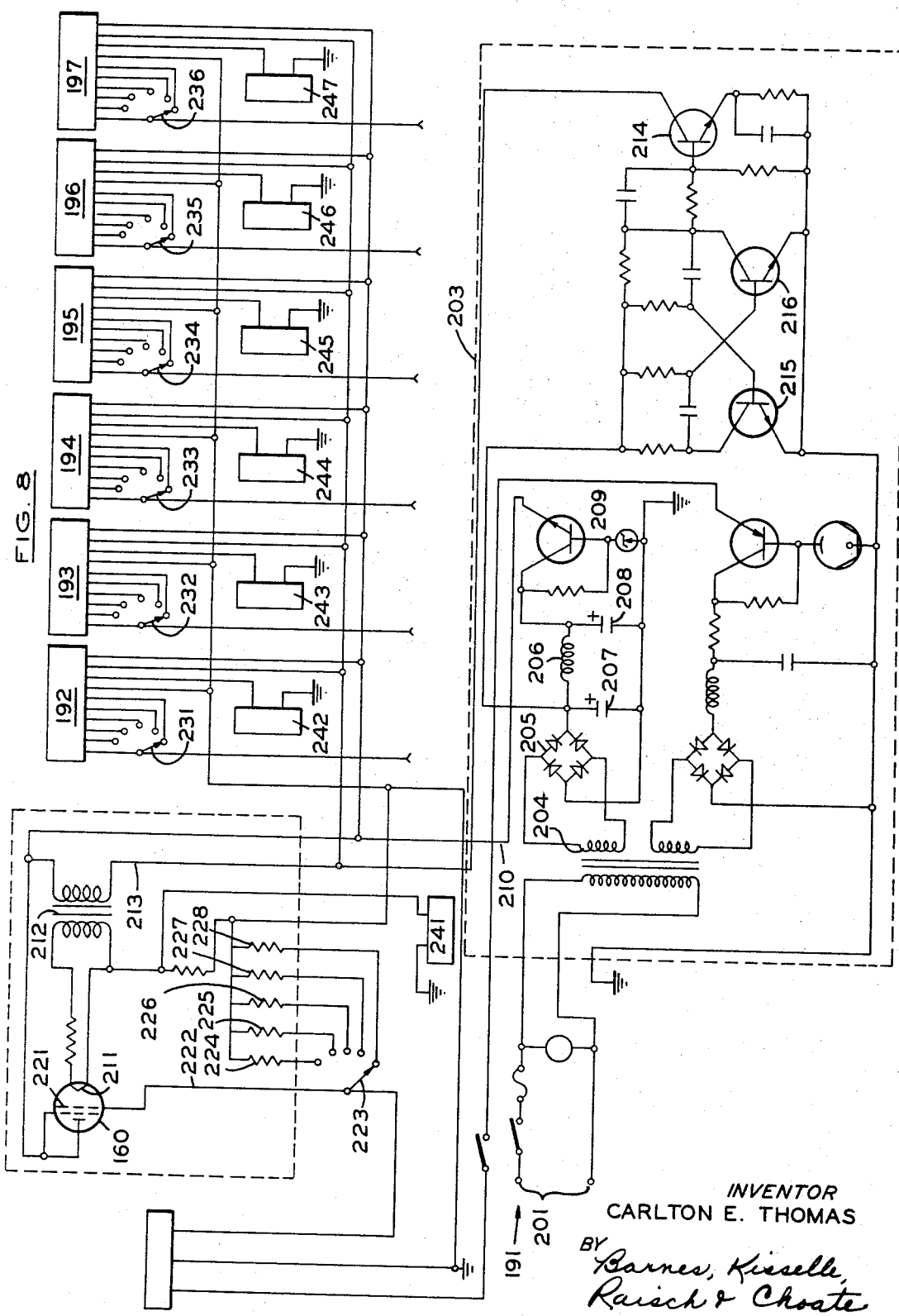

United States Patent Office 3,406,252
Patented Oct. 15, 1968

3,406,252
FIBER OPTIC OUTPUT TRANSFORMATION FOR MULTIPLE ELECTRON DISCHARGE DEVICES
Carlton E. Thomas, Ann Arbor, Mich., assignor to Conductron Corporation, Ann Arbor, Mich., a corporation of Delaware
Filed Feb. 11, 1965, Ser. No. 431,954
3 Claims. (Cl. 178—6.7)

ABSTRACT OF THE DISCLOSURE

An electro-optical apparatus for converting from time-varying voltage to time-varying light and vice versa including a compact cluster of electron discharge devices such as cathode ray tubes with a plurality of light conduits for compacting the output of the tubes to a dense pattern of light, an optical system for treating said light to further refine it, and a recording device to provide a continuous time-varying record, the apparatus being reversible to move from a continuous light varying record to a plurality of time-varying voltages.

---

This invention relates generally to electro-optical systems, and more particularly to a system having a translator for converting between time-varying voltage and time-varying light. The conversion may be from voltage to light, or from light to voltage, or both.

Such translators may be employed as input and output accessories for optical computers. Photographic film can be used as a storage medium for optical computers. Data to be stored may originally be supplied as a time-varying voltage and it is necessary to convert this voltage to time-varying light which can then be recorded on photographic film. Sometimes it is desirable to convert several time-varying voltages into corresponding tracks on a film by first translating the voltages into time-varying light. Similarly, it is sometimes necessary to convert one or more time-varying light beams into time-varying voltages by means of translating equipment.

It is an object of this invention to provide translating equipment capable of handling data at a faster rate than known equipment.

Another object of this invention is to extend the upper frequency limit of electro-optical translating equipment.

Another object of the invention is to conserve as much space as possible while still providing translating equipment with high frequency capabilities.

A further object of the invention is to provide simple optics for translating equipment whereby light may be transmitted between electronic devices and light beams located remotely from those devices.

Still another object is to provide a translator whereby signals produced by electronic devices are converted into very closely spaced modulated light beams.

In the drawings:

FIG. 1 is a perspective view of an electro-optical system including a multi-channel translator and a film recorder.

FIG. 2 is a top view of the translator of FIG. 1 with a portion of the cover cut away to reveal the components inside the housing.

FIG. 3 is a cross sectional view of the translator taken along line 3—3 of FIG. 2.

FIG. 4 is a block diagram for the electro-optical system of FIG. 1.

FIG. 5 is a circuit diagram for the electronic portion of the translator of FIGS. 1–4.

FIG. 6 shows a translator in accordance with another embodiment of the invention in which modulated light is converted into electrical signals.

FIG. 7 is a cross sectional view taken along line 7—7 of FIG. 6.

FIG. 8 is a circuit diagram for the electronic portion of the translator of FIGS. 6 and 7.

The electro-optical system of FIG. 1 includes a translator 10, a film recorder 11 and a slit assembly 12. The translator directs seven vertically spaced light beams along the paths represented by dashed lines 13–19 through the slit assembly 12 and a relay lens 20 to a film 21 in recorder 11. The film may be ordinary 35 mm. photographic film. The light beams emerge from the ends 22–28 of seven light conduits, the end portions of the conduits being visible at the right side of the translator 10 as viewed in FIG. 1. Input signals are supplied to the translator through a connector 31, and the purpose of the translator is to convert the latter signals into the light beams 13–19 for recording on the film 21. Power from an external source is supplied to the translator 10 through a connector 38. The slit assembly 12 has a frame 32 in which is mounted an opaque plate (not shown) having a narrow vertical transparent slit. The slit merely narrows the beams 13–19 so that the film 21 is illuminated by thin strips of light. The position of slit assembly 12 may be adjusted by turning an adjusting control 30. Film 21 is supplied from a reel 33 over rollers 34, 35 to a take-up reel 36. Suitable driving mechanism 37 is provided in the recorder.

The translator unit 10 is housed in a light-tight box 30 which, together with the slit assembly 12 and the recorder 11, is mounted on a bench 39. A microscope 41 may also be mounted on the bench, and its object lens 42 extends through a wall of housing 44 of the recorder to allow viewing of the film. Housing 44 is also light-tight, although the cover has been removed in FIG. 1 to illustrate the parts inside the housing.

FIGS. 2 and 3 show the components inside the translator unit 10. There are seven cathode ray tubes 50–56 plugged into sockets 57 mounted on a transverse wall 58 within housing 30. In order to conserve space, miniature cathode ray tubes are preferred and they are mounted in a close-packed pattern. Where the translator has seven channels, there may be one central tube 50 with the other six tubes 51–56 arranged on a circle about the central tube as shown in FIG. 3. There are seven light conduits, one for each tube, leading from the faces of the respective cathode ray tubes through the right-hand end walls 59 and 60 of housing 30. Only three such conduits 47, 48 and 49 are visible in FIG. 2, but the inner ends 62–68 of all of the conduits are visible in FIG. 3. These inner ends are supported by a transverse housing wall 69 in positions next to the centers of the respective cathode ray tubes. When the cathode ray tubes are energized, a light spot appears at the center of each tube face. The inside of each tube face is luminescent and ordinarily is coated with a phosphor material. The tube face itself is transparent such that the light of the spot passes through the tube face into one of the end portions 62–68 of the light conduits.

Each light conduit consists of a bundle of single glass fibers. Each light conducting fiber may be provided with a low index cladding of sufficient thickness to insulate the fiber from its surroundings. The cladding may also serve to bond the fibers together to form the fiber bundle. For a light conduit, the fibers need not be aligned. An unaligned bundle of single fibers is said to be incoherent. The bundle ordinarily has a substantial degree of flexibility.

The major components of the electro-optical system of FIG. 1 are represented by blocks in FIG. 4. The electronic portion of the system is represented by block 70, and this includes the cathode ray tubes 50–56. Power for energizing the tubes is supplied from a separate power supply 71. Seven input signals are fed into the electronic section 70 as indicated in FIG. 4. The optical portion of the translator is represented by block 72. The light beams supplied from optical assembly 72 pass through the vertical slit 73 and a relay lens 74 to the recording camera 75 where the light spots are recorded on a film indicated as an output in FIG. 4. The seven input signals are thus converted to seven tracks on film, the density of each track varying in proportion to the modulation of the corresponding input signal.

FIG. 5 shows a suitable circuit for the electronics section 70 (FIG. 4). The detailed circuit for only one channel 81 is shown in FIG. 5. Since the circuits for the other channels are substantially identical to the illustrated channel, they are represented by blocks 82–87. Channel 81 includes an amplifier 91, a control section 92 and a cathode ray tube 62. Operating voltage for the amplifier 91 is supplied from the power supply 95 via a bus 94 which is also connected to channels 82–87. The other power supplying bus 96 receives negative voltage. Bus 94 may be at positive 20 volts and bus 96 at negative 20 volts. Bus 97 is grounded (0 volt).

The input signal appears across a potentiometer 93 at the input of amplifier 91. Any desired portion of the input signal may be derived from potentiometer 93 by means of a variable tap 98 which feeds the input signal to the base of transistor 101. Transistor 101 drives the base of transistor 102 which in turn drives the output transistor 103. The three transistors and associated components constitute a three-stage DC-coupled transistor amplifier. Resistors 104, 105, 106, 107, 108, 109, 110 and 111 provide proper bias for operating transistors 101, 102 and 103. Resistors 112, 113 and 114 are the load resistors for the transistors. Zener diode 115 is connected to the base of transistor 103 for voltage regulating purposes.

The output signal from amplifier 91 is fed via conductor 116 to the control grid 117 of cathode ray tube 62. As previously mentioned, tube 62 may be a miniature type, and a suitable tube is designated RCA 1EP11. A beam is produced in the tube 62 by establishing a large potential difference between the anode represented schematically as 122 and the cathode 123. The cathode is heated by means of the usual filament 124 which is energized by current from the power supply 95. Anode 122 is shown grounded here, and the cathode 123 may typically receive a potential of negative 1100 volts. The anode is normally a conductive coating on the tube's wall. A focusing electrode 126 is connected by load 127 to a potentiometer 128, one end of which is connected by resistor 129 to the grounded bus 97 and the other end of which is connected by resistor 130 to the power supply via lead 131. Variable tap 132 may be adjusted to focus the electron beam by varying the potential on focusing electrode 126.

Although the cathode ray tube will ordinarily have a horizontal deflection system and a vertical deflection system, represented here by horizontal deflecting plates 118, 119 and vertical deflecting plates 120, 121, it is to be understood that the cathode ray beam is not deflected. The signal on control grid 117 modulates the intensity of the beam and thus varies the intensity of the light spot appearing on the face of the tube, but the light spot stays stationary.

Potentiometers 135 and 136 are provided to allow adjustment of the potential on the vertical deflection electrodes 120 and 121, and additional potentiometers 137 and 138 allow adjustment of the potential on horizontal deflection electrodes 118 and 119. These adjustments may be used to center the beam. Resistors 139–142 are connected in the leads from potentiometers 135–138 to the corresponding deflecting electrodes. One end of potentiometer 135 is connected to grounded bus 97 via resistor 143 and lead 144, and the other end of potentiometer 135 is connected to lead 131 which goes to the power supply 95. There is a switch 146 for selectively connecting input resistor 93 either to the input terminal board 147 or to lead 148 which is connected to a test signal source 149 used for calibrating the circuit.

The operation of the circuit is evident from the preceding description. The input singal is a time-varying voltage which is amplified by three stage amplifier 91. The amplified signal is applied to the control grid 117 of cathode ray tube 62 and serves to modulate the beam current of the tube. The beam current is therefore made to vary in proportion to the input voltage. The modulation may be a continuous function or it may be such as to turn the beam on and off. The light spot, which appears at the face of tube 62 where the beam impinges on its phosphor coating, remains stationary because the beam is not deflected. However, the intensity of the light spot varies in proportion to the time-varying input voltage. Light from the spot is transmitted to the outside of the housing 30 (FIGS. 1–3) by the corresponding light conduit, which as previously explained, is a fiber optic bundle. The horizontal cross section of the light transmitted from the remotely located end of the light conduit is limited by the vertical slit of assembly 12 (FIG. 1). This narrow strip of light becomes the resolution element of the data which is recorded on the film 21.

Space is conserved by arranging six of the cathode ray tubes in a circular array with the seventh tube in the center of the array, the tube axes being parallel to each other. The light conduits transmit the circularly arrayed light spots to a vertical array of closely spaced light beams. The film, then, contains seven equally spaced channels of data, each with the same time reference origin on film.

The translator which has been described serves to convert time-varying voltage into time-varying light. Where it is necessary to convert time-varying light into time-vary voltage, the translator embodiment of FIGS. 6 and 7 may be used. The construction of the latter translator is similar in principle to that of FIGS. 1–5, but different components are employed. The components are contained in a light-tight box or housing 151 having two transverse walls 152 and 153 and end walls 154 and 155. In this embodiment, there are seven photo-multiplier tubes 160–166 (FIG. 7), six of the tubes being arranged circularly about a central tube 160 in the same manner as described previously in connection with cathode ray tubes 50–56. Photomultiplier tubes 160–166 are supported with their longitudinal axes parallel to each other in a closely-packed array by sockets 167 mounted on transverse wall 153. Electrical power for energizing the tubes is supplied to the translator through a suitable connector 168.

There are seven light conduits 170–176 in box 151, and they may be the same type of fiber optics bundles as those described previously. As viewed in FIG. 5, the right hand ends of conduits 170–176 are supported by transverse wall 152 at the centers of the corresponding photomultiplier tubes. The left hand ends of conduits 170–176 are supported in a vertical array in an adjustable slide 156 and closely spaced from each other by end wall 154. The slide 156 is adjustable horizontally by a thumb screw 157. The left hand ends of the conduits are positioned by end wall 154 so as to intercept seven beams of light that are represented schematically by dashed lines 181–187.

The light beams may be supplied from any suitable source, a typical source being the output of an optical cross corelator. In some cases, light beams produced by illuminating a film such as the film 21 may be fed into the translator of FIGS. 6 and 7. In either case, the light conduits intercept the beams 181–187 and transmit the light to the photo-multiplier tubes 160–166. The photomultipliers convert the light energy into electrical energy and then amplify that energy by multiple secondary emission effects. The output current from each photo-multiplier tube is amplified, and a suitable seven-channel amplifying circuit is shown in FIG. 8.

Referring to FIG. 8, there are seven electrometer amplifier stages 191–197, but the detailed circuitry of only amplifier 191 is shown. Current is supplied from a 115 volt, sixty-cycle line outlet to the input terminals 201 and is fed via transformer 202 to the power supply section of the circuit which is enclosed by the dashed line 203. One secondary winding 204 of transformer 202 is connected to a bridge rectifier 205, the output from which is filtered by coil 206 and capacitors 207 and 208. The rectified and filtered voltage is amplified by a transistor 209 and fed via lead 210 to photo-multiplier tube 160. The filament 211 of tube 160 is heated by current supplied through transformer 212 and lead 213 from the output transistor 214 of power supply 203. Transistor 214 amplifies the output of a flip-flop (multivibrator) including transistors 215 and 216 which are driven by the rectified output voltage from bridge rectifier 205.

The output signal is derived from electrode 221 of tube 160 and is fed through lead 222 to a five-position switch 223. The fixed contacts of switch 223 are connected respectively to resistors 224–228, each of which has a different value so as to allow a sensitivity adjustment. The output current from a photo-multiplier tube is essentially constant for a given light level. Thus, the sensitivity can be increased by increasing the load resistor across the photo-multiplier output. Similar sensitivity switches 231–236 are provided for the other channels 192–197. The boxes 241–247 represent electrometer follower circuits which simply translate or reduce the high output impedance of the photo-multiplier tubes to a lower level so that the output signal may be used to drive pen recorders without loading down the photo-multiplier tubes.

It is evident from the preceding description that translators may be provided in accordance with the invention either to convert electrical signals into light or conversely to convert light into electrical signals using light conduits comprised of single glass fibers as the medium for conducting light between light beams and electron discharge devices. In one embodiment, the electron discharge devices are cathode ray tubes, and in the other embodiment, the electron discharge devices are photo-electric tubes (photo-multipliers). Both cathode ray tubes and photo-multipliers may be operated at higher frequencies than incandescent lights for example, so the frequency range of the translator is extended to the limit of the cathode ray tube or photo-multiplier.

The light conduits are a simple form of optics for conducting light between the fairly widely separated light spots represented by the tubes and the much more closely spaced light beams. The light conduits facilitate a space conserving arrangement of the tubes and make the system compatible with commercially available photographic films.

I claim:

1. An electro-optical system for converting time-varying electrical signals to visual data and vice versa and for improving the frequency limits of such transfer in a compact device comprising:
 (a) a plurality of electron discharge devices each having a longitudinal axis and a face portion at one end thereof through which light is passed in the operation of the system, the devices being grouped in a close cluster within a protective housing with the face portions substantially in a single plane,
 (b) a plurality of elongated light conduits each having one end supported in a wall within said housing adjacent said plane and an end of each conduit disposed directly adjacent a face portion of a respective discharge device, each light conduit having an outside diameter substantially smaller than the face portion of any said discharge device, the other ends of said conduits being compacted at an outer wall of said housing in a dense pattern area which is smaller than the area of even one face portion.

2. A system for converting a plurality of analog time-varying voltages into data information on film which comprises:
 (a) a plurality of electron discharge devices each having a longitudinal axis and a face portion at one end thereof through which light is passed in the operation of the system, the devices being grouped in a close cluster within a protective housing with the face portions substantially in a single plane,
 (b) a plurality of elongate light conduits each having one end supported in a wall within said housing adjacent said plane and an end of each conduit disposed directly adjacent a face portion of a respective discharge device, each light conduit having an outside diameter substantially smaller than the face portion of any said discharge device, the other ends of said conduits being compacted at an outer wall of said housing in a dense pattern area which is smaller than the area of even one face portion,
 (c) a mechanical slit assembly mounted adjacent said housing at said outer wall to narrow the output of said compacted conduits to a thin strip of light,
 (d) an electronic circuit connected with said discharge devices to energize said devices respectively in direct response to a plurality of time-varying voltages, and
 (e) a film carrying device mounted in a line passing through said compacted conduits and said slit to move a recording film past the said slit to record the time-varying voltage inputs continuously in multiple channels on said film to obtain a compact record of the output of said plurality of discharge devices.

3. An electro-optical system for converting time-varying electrical signals to visual data and vice versa for improving the frequency limits of such transfer in a compact device comprising:
 (a) a plurality of cathode ray tubes each having a luminescent face,
 (b) circuit means connected to said cathode ray tubes for energizing the same to produce an electron beam in each said tube and a light spot where said beam impinges on the face of said tube, said circuit means including a control circuit portion for each said tube for modulating the intensity of said beam to thereby vary the intensity of said light spot in response to an input signal,
 (c) means supporting said cathode ray tubes in a compact arrangement closely adjacent each other in a predetermined pattern,
 (d) a plurality of elongated light conduits for conducting light of said spots to another part of said system,
 (e) means supporting each said light conduit with one end portion thereof adjacent the face of a corresponding one of said tubes at the portion of said face where said light spot appears in the operation of said system and with the other end portions of said light conduits at positions closely adjacent each other located remotely from said tubes,
 (f) an optical system having its input at said other end portions of said light conduits and its output at a location remote from said input, and
 (g) a recording means at the output of said optical system to record the time-varying voltage inputs continuously in multiple channels to obtain a compact record of the output of said plurality of cathode ray tubes.

References Cited

UNITED STATES PATENTS

| | | | |
|---|---|---|---|
| 3,235,660 | 2/1966 | Treseder | 178—7.6 |
| 3,130,263 | 4/1964 | Manning. | |
| 3,184,732 | 5/1965 | Haynes. | |
| 3,294,903 | 12/1966 | Goldmark. | |

ROBERT L. GRIFFIN, *Primary Examiner.*

H. W. BRITTON, *Assistant Examiner.*